United States Patent [19]
Sonderegger et al.

[11] 3,857,287
[45] Dec. 31, 1974

[54] PRESSURE TRANSDUCERS

[75] Inventors: Hans Conrad Sonderegger, Neftenbach; Paul Engeler, Ober-Ohringen; Eugen Lutz Jun, Winterthur, all of Switzerland

[73] Assignee: Kistler Instrumente AG, Winterthur, Switzerland

[22] Filed: Apr. 27, 1973

[21] Appl. No.: 355,096

[30] Foreign Application Priority Data
May 8, 1972   Switzerland.................. 6820/72

[52] U.S. Cl. ......................... 73/395, 73/398 R
[51] Int. Cl. ......................... G01l 7/08, G01l 9/08
[58] Field of Search........... 73/398 R, 395, 88.5 SD, 73/115, 116

[56] References Cited
UNITED STATES PATENTS
3,031,591  4/1962  Cary et al. ......................... 73/398 R
3,672,223  6/1972  Spescha ........................... 73/398 R FOREIGN PATENTS OR APPLICATIONS
394,637  6/1965  Switzerland..................... 73/398 R
454,490  4/1968  Switzerland..................... 73/398 R

*Primary Examiner*—Donald O. Woodiel
*Attorney, Agent, or Firm*—Craig & Antonelli

[57] ABSTRACT

A pressure transducer for measuring pressures during combustion processes has the pressure sensitive element disposed in a tubular body under a preload. The end of the tubular body facing the combustion process is fitted with a disc-shaped diaphragm, which has an outer flexible portion and an inner circular portion which is provided with a heat shield. A temperature resistant material fills a radial recess around the heat shield retaining portion of the diaphragm.

12 Claims, 3 Drawing Figures

PRESSURE TRANSDUCERS

The present invention relates to pressure transducers which are exposed to rapidly varying temperatures as well as varying pressure. Such phenomena are encountered mainly during pressure measurements on engines, on ballistic installations and in process engineering. Here the problem is how to measure the pressure behavior so that false data due to the varying temperature of the medium can be reduced to a minimum.

It is necessary to differentiate between temperature changes taking place within milliseconds and those lasting several seconds. The invention relates to the first category, i.e., to very rapid temperature changes which occur mainly in combustion processes, accompanied by wide pressure changes at the same time. Thus, in diesel engines, for example, at the moment of ignition, temperature increases of well over 1,000°C occur within milliseconds of fractions or a millisecond.

Metrology has endeavored to overcome these difficulties by various means, though unfortunately without much success. It is still not possible to measure the pressure cycle of an internal combustion engine so exactly that the combustion process can be followed with a computer, yielding information on the mechanical and combustion efficiencies of the machine. To accomplish this the pressure inside the cylinder must be measured with a very high accuracy, and data which is erroneous by only a few percent due to temperature influences is no longer acceptable.

For such measuring purposes, only piezoelectric measuring technology could be used in practice up to now, though the invention is not confined to this.

In both the technical and the patent literature arrangements have been disclosed in which mass components of the lowest possible susceptibility are located on the pressure sustaining surfaces, so that the delicate crystals can be placed in zones where they have more thermal protection. Other designs have resorted to heat accumulating plates and heat retarding coatings. These methods are generally unsatisfactory, because the diaphragm parts of the pressure transducers, as well as the measuring elements, must be protected against temperature changes. Under temperature changes, the stress state of the transducer diaphragm changes also, of course, resulting in force changes which act on the measuring elements as error signals.

The subject of the invention has been perfected during years of experimentation so that for the first time pressure transducers can now be made which allow the application of modern analytical evaluation methods to combustion processes.

The invention will be explained as follows with reference to the drawings, wherein.

Figure 1:
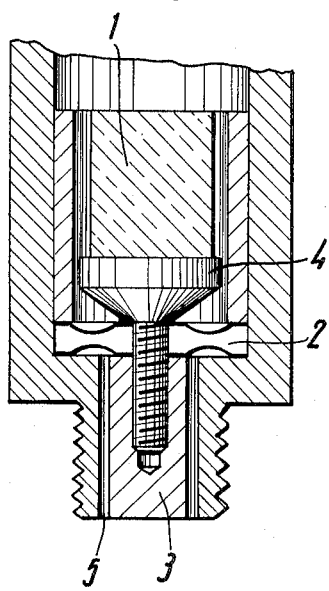
FIG. 1 shows a cross section through a prior art pressure transducer in which the measuring crystals are set back from the diaphragm part.

According to the present state of the art, FIG. 1 shows the screwed-in part of a pressure transducer in cross section, with 1 the measuring crystal assembly, 2 the sealing diaphragm clamped in position, which also acts as a preloading disc spring. The cylindrical projection 3 has a screw connection with the force transmitting disc 4 and the disc spring 2. The pressure medium acts against the diaphragm part through the long annular passage 5. By means of this annular gap or passage 5 effective cooling of the hot gas is obtained, while, at the same time, the crystal assembly 1 is displaced from the medium being measured. One disadvantage of this arrangement is the susceptibility of the annular passage 5 to foulings, of course, as well as the large mass of the cylindrical projection 3, which gives rise to erroneous acceleration signals.

Figure 2:
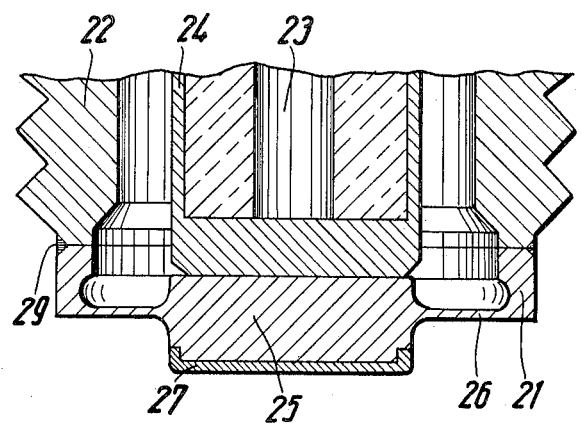
FIG. 2 shows a cross section of the diaphragm part of a commercial pressure transducer with a protective plate.

FIG. 2 shows a configuration which, compared to the arrangement of FIG. 1, is superior in many respects. The disc spring diaphragm 21 is welded to the housing 22 and has a reinforced part 25 in the center. On this, the bottom of the preloading sleeve 24 rests under preload. Accommodated in the preloading sleeve 24 is the crystal assembly 23. Applied to the projecting part of the disc 25 is a heat protective layer 27. Such a coating cannot be applied to the flexible annular part 26 of the diaphragm however. To alleviate this disadvantage somewhat it has been suggested that the disc 25 might be given a flanged face, so that part of the flexible annular part would be covered. This design, however, leads to undesirable superimposed vibration in the open flange. Another disadvantage is that welding is carried out on a part subjected to high thermal and mechanical stressing, which may lead to fatigue failures.

Figure 3:
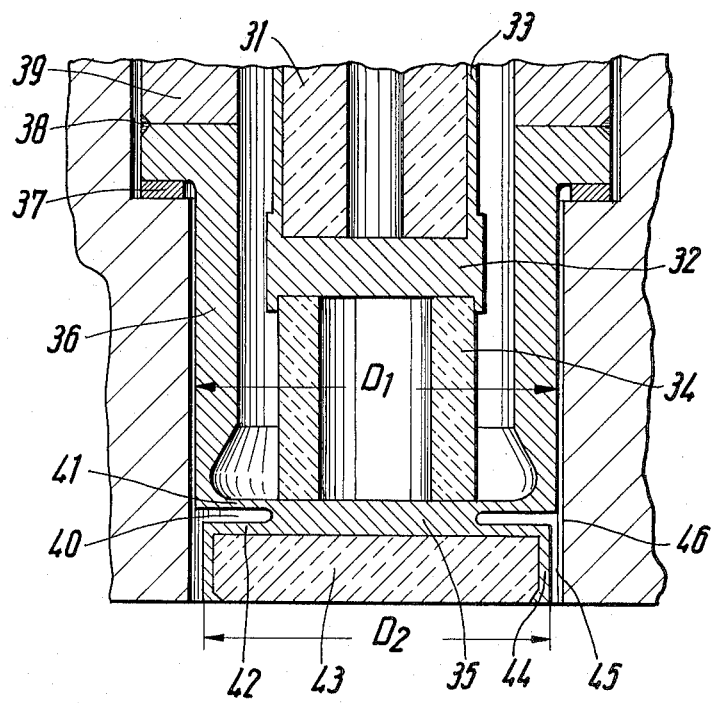
FIG. 3 shows a cross section through the front end of a pressure transducer in accordance with the invention.

The difference which the present invention provides over the art is that the transducer according to the invention has a diaphragm part incorporating significant improvements. As shown in FIG. 3, the force-sensitive measuring assembly is welded directly to the transducer housing 39 under preload by the tubular spring 33. Centered on the bottom of a tube 32 is a ceramic force transmission tube 34, which rests on a flat diaphragm 35. The diaphragm 35 leads along the tubular part 36 to behind the sealing surface 37 of the pressure transducer, where it is joined to the transducer body 39 by a weld 38. The diaphragm disc 35 is divided by a narrow recess 40 into the flexible annular part 41 and the flame protection holder part 42. The cylindrical extension 44 of this part holds the ceramic heat shield 43 under radial preload and secures it by familiar means. Owing to this radial preload the thin annular part 42 is stiffened, so that it cannot effect any natural vibration. Limited by the mounting hole 46 a short annular gap 45 results, which is dimensioned for favorable conditions, so that the sensitive diaphragm part 41 is not touched by the flame front. By matching the diameter ratios $D_2:D_1$ it is also possible to dampen any excessive pressure rises to a desired amount.

In addition, the very narrow recess 40 is filled with a flexible, temperature resistant paste. Through the protective action of the annular passage 45 on the recess part 40 and through the gripped flame shielding disc 43 of ceramic or glass-like material having low thermal conductivity and a low coefficient of thermal expansion, the diaphragm disc 35 with its flexible annular parts 41 sustains only moderate temperature distortion, so that its force reactions on the measuring element 31 remain within acceptable limits. In addition, however, the measuring element 31 is insulated satisfactorily from the diaphragm disc 35 by the ceramic tube 34.

In addition to providing thermal protection this insulation also insulates the measuring element 31 electrically from the diaphragm part 35 and from the outer parts of the housing 39, thereby effecting metrological advantages. Finally, transferring the weld part 38 behind the sealing part 37 of the transducer achieves the advantage that the weld does not have to follow the temperature and pressure fluctuations, thereby assuring longer life. The easily accessible annular gap 45 and the radial gap 40 can be easily cleaned, if necessary, after dismantling the transducer. The device in accordance with the invention thus brings, for the first time, significant advances in the design of pressure transducers for application in systems subjected to alternating thermal loads.

We claim:

1. A transducer for measuring pressures during combustion processes comprising:
   a housing;
   a tubular body fitted to said housing;
   a measuring element disposed within said tubular body;
   a disc-shaped diaphragm fitted to said measuring element under a preload, said diaphragm having an outer flexible diaphragm portion and a cylindrically-shaped flexible holder portion, for retaining a heat protective disc, separated from said flexible diaphragm portion by a radial recess which extends approximately to at least half the diameter of said disc-shaped diaphragm, and wherein the outer diameter of said cylindrically-shaped flexible holder is less than the diameter of said tubular body.

2. A transducer according to claim 1, further including a ceramic plate bracing said measuring element against said disc-shaped diaphragm.

3. A transducer according to claim 1, wherein said disc-shaped diaphragm and said tubular body are a single piece of material, with the tubular body portion thereof being welded to said housing.

4. A transducer according to claim 1, further comprising a flexible, temperature resistant compound filling said radial recess.

5. A transducer according to claim 1, wherein said heat protective disc consists of a fire-proof glass and is joined to said disc-shaped diaphragm under a mechanical preload.

6. A transducer according to claim 1, wherein said heat protective disc consists of a ceramic material and is joined to said disc-shaped diaphragm under a mechanical preload.

7. A transducer for measuring pressures during combustion processes comprising:
   a housing;
   a tubular-shaped body fitted to said housing;
   a disc-shaped diaphragm fitted to one end of said tubular-shaped body, said diaphragm having an outer annular flexible portion and an inner circular flat portion, contiguous to said outer portion, and a cylindrically-shaped flexible holder, retaining a heat-protective disc, contiguous to said circular flat portion and being separated from said outer portion by a radially extending recess therebetween, the outer diameter of said cylindrically-shaped flexible holder being less than the outer diameter of said tubular-shaped body; and
   a measuring element disposed within said tubular-shaped body under a preload.

8. A transducer according to claim 7, further comprising a force transmission tube resting on said disc-shaped diaphragm and a tubular preload element connected to said transmission tube and confining said measuring element therein.

9. A transducer according to claim 7, wherein said diaphragm and said tubular-shaped body are of one piece construction and are fitted to said housing through a weld between a flange portion of said tubular-shaped body and an edge of said housing.

10. A transducer according to claim 7, further including a flexible, temperature-resistant compound filling said radially extending recess.

11. A transducer according to claim 9, further including a flexible, temperature-resistant compound filling said radially extending recess.

12. A transducer according to claim 11, further comprising a force transmission tube resting on said disc-shaped diaphragm and a tubular preload element connected to said transmission tube and confining said measuring element therein.

* * * * *